(12) United States Patent
Fredette et al.

(10) Patent No.: US 6,697,361 B2
(45) Date of Patent: *Feb. 24, 2004

(54) METHOD AND APPARATUS FOR STREAM AGGREGATION IN A MULTIPROTOCOL LABEL SWITCHING NETWORK ENVIRONMENT

(75) Inventors: Andre N. Fredette, Groton, MA (US); Christopher J. White, N. Chelmsford, MA (US)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,638

(22) Filed: Sep. 15, 1998

(65) Prior Publication Data

US 2002/0110119 A1 Aug. 15, 2002

(51) Int. Cl.[7] .............................................. H04L 12/56
(52) U.S. Cl. .................................... 370/389; 370/395.1
(58) Field of Search ................................. 370/355, 389, 370/392, 409, 410, 431, 432, 905, 395.1, 396, 395.3, 395.31, 395.5, 400, 411, 352, 351, 401; 709/230, 237, 238, 242, 200

(56) References Cited

U.S. PATENT DOCUMENTS

| | | | | |
|---|---|---|---|---|
| 5,903,559 A | * | 5/1999 | Acharya et al. | 370/355 |
| 5,917,820 A | * | 6/1999 | Rekhter | 370/392 |
| 5,991,300 A | * | 11/1999 | Tappan | 370/392 |
| 6,009,097 A | * | 12/1999 | Han | 370/395 |
| 6,021,263 A | * | 2/2000 | Kujoory et al. | 395/200.62 |
| 6,031,841 A | * | 2/2000 | Woundy | 370/410 |
| 6,038,230 A | * | 3/2000 | Ofek | 370/389 |
| 6,055,561 A | * | 4/2000 | Feldman et al. | 709/200 |
| 6,069,889 A | * | 5/2000 | Feldman et al. | 370/351 |
| 6,092,113 A | * | 7/2000 | Maeshima et al. | 709/230 |
| 6,101,549 A | * | 8/2000 | Baugher et al. | 709/238 |
| 6,205,488 B1 | * | 3/2001 | Casey et al. | 709/238 |
| 6,332,198 B1 | * | 12/2001 | Simons et al. | 714/6 |

FOREIGN PATENT DOCUMENTS

GB  2320159 A  6/1998

OTHER PUBLICATIONS

Rosen et al., MPLS Architecture, Jul. 1998, Internet Draft, pp. 1–64.*

Nancy Feldman and Arun Viswanathan. "ARIS Specification." Mar. 1997. Internet Draft. Advanced Networking Technologies IBM. pp. 1–36.*

Arun Viswanathan, Nacy Feldman, Zheng Wang, and Ross Callon. "Evolution of Multiprotocol Label Switching." May 1998. IEEE Communications Magazine. pp. 165–173.*

Ross Callon, Paul Doolan, Nancy Feldman, Andre Fredette, George Swallow, and Arun Viswanathan. "A Framework for Multiprotocol Label Switching." Apr. 3, 1997. http://cell-relay.indiana.edu/mhonarc/mpls/1997-Apr/sg00010.html.*

(List continued on next page.)

*Primary Examiner*—John Pezzlo
(74) *Attorney, Agent, or Firm*—Blakely Sokoloff Taylor & Zafman LLP

(57) ABSTRACT

A method and apparatus for stream aggregation in a multi-protocol label switching network environment. According to one embodiment, the method comprises receiving a label assignment request that includes an identification of a path followed by the label assignment request through the network and determining whether the path has been used by any of a plurality of previous label assignment requests. A new label is assigned for the path if the path has not been used by any of the plurality of previous label assignment requests. Otherwise, a previously assigned label is assigned.

26 Claims, 7 Drawing Sheets

OTHER PUBLICATIONS

Bruce Davie, Yakov Rekhter, Eric Rosen, Arun Viswanathan, Vijay Srinivasan, and Steven Blake. "Use of Label Switching With RSVP. " Mar. 1998. Internet Draft. Network Working Group. pp. 1–12.*

Fred Baker and Yakov Rekhter. "Tag Swithing with RSVP." Dec. 1996. Internet Draft. pp. 1–7.*

Le Frucher, F., "IERF Multiprotocol Label Switching (MPLS) Architecture" 1998 1st IEEE Internation Conference on ATM. ICATM '98. Conference Proceedings, Colmar.
France, Jun. 22–24, 1998, IEEE Internation Conference on ATM, New York, NY: IEEE, US, Jun. 22, 1998, pp. 6–15, XP010290976; ISBN: 0–7803–4982–2.

* cited by examiner

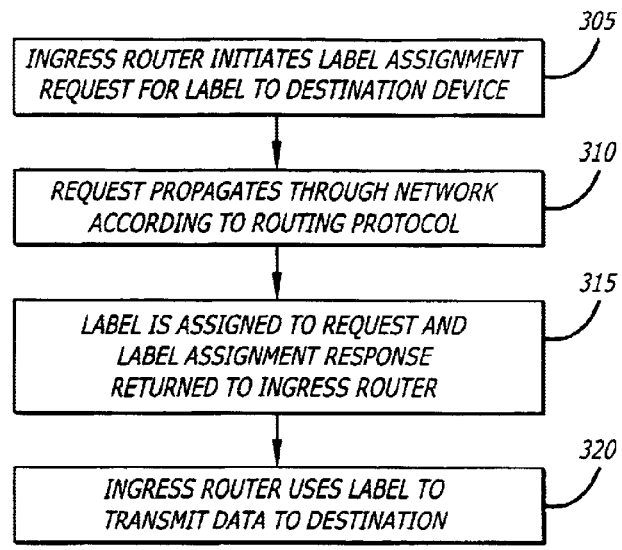

FIG. 3

305 INGRESS ROUTER INITIATES LABEL ASSIGNMENT REQUEST FOR LABEL TO DESTINATION DEVICE

310 REQUEST PROPAGATES THROUGH NETWORK ACCORDING TO ROUTING PROTOCOL

315 LABEL IS ASSIGNED TO REQUEST AND LABEL ASSIGNMENT RESPONSE RETURNED TO INGRESS ROUTER

320 INGRESS ROUTER USES LABEL TO TRANSMIT DATA TO DESTINATION

| INPUT PORT | INPUT MID | OUTPUT PORT | OUTPUT MID |
|---|---|---|---|
| ⋮ | ⋮ | ⋮ | ⋮ |
| 0 | 0 | 2 | 5 |
| 0 | 1 | 2 | 6 |
| 1 | 0 | 3 | 4 |
| 5 | 0 | 8 | 0 |
| 5 | 1 | 2 | 4 |
| 5 | 2 | 4 | 3 |
| ⋮ | ⋮ | ⋮ | ⋮ |

| INPUT PORT | INPUT MID | LABEL |
|---|---|---|
| 0 | 0 | 1 |
| 0 | 1 | 2 |
| 0 | 5 | 3 |
| 1 | 0 | 4 |
| 1 | 3 | 5 |
| ⋮ | ⋮ | ⋮ |

METHOD AND APPARATUS FOR STREAM AGGREGATION IN A MULTIPROTOCOL LABEL SWITCHING NETWORK ENVIRONMENT

BACKGROUND OF THE INVENTION

1. Field of the Invention

The present invention pertains to multiprotocol label switching network environments. More particularly, this invention relates to aggregating data streams in a multiprotocol label switching network environment.

2. Background

Computer systems are increasingly becoming commonplace in homes and businesses throughout the world. As the number of computer systems increases, more and more computer systems are becoming interconnected via networks. New devices as well as new methods of using both new and existing devices are continually being developed to improve the performance of such networks.

One such method is referred to as multiprotocol label switching (MPLS). MPLS integrates network layer (often referred to as layer 3) routing with a label swapping forwarding paradigm used by the link level (often referred to as layer 2) in a network. MPLS may use asynchronous transfer mode (ATM) switching hardware to route higher level (e.g., Internet Protocol or "IP", protocols rather than the more traditional ATM addressing and switching mechanisms. A data packet being transferred through the network is assigned a "label" based on its entry and exit points to and from the network. When a switch within the network receives the data packet, it removes the current label uses the current label as an index into a table that identifies both the next switch or router and a new label. This new label is then forwarded to the next switch or router along with the data packet, which repeats the label replacement or swapping steps, or transfers the data packet out of the network as appropriate.

One problem encountered in using MPLS is the number of labels within the network that are required to support MPLS. As the number of sources and destinations in a network increases, as well as the potential number of routes, the number of labels required becomes extremely burdensome, and can be prohibitively large to be useable in most currently available hardware components within the network.

One solution is to aggregate data streams within the network on a single label. A data "stream" refers to one or more bytes of data to be transferred from a source to a destination via the network. Multiple destination devices may access the network via the same router, resulting in the paths to these multiple destinations sometimes being the same. New hardware devices, typically including additional hardware buffering capabilities, can be developed that allow the data from these one or more sources to the same destination to be merged so that only a single label is needed for the path. However, typical hardware components that are currently available do not support such aggregation. Thus, it would be beneficial to provide a way to aggregate data paths with currently available hardware devices as well as hardware devices currently installed in various locations.

Another solution is to use the same label for each possible source to a particular destination, thereby reducing the number of labels to be equal to the number of possible destinations. However, a problem of "cell interleaving" occurs with this solution. When data is transferred through the ATM switching hardware, it is transferred in small portions referred to as "cells". If all sources were to use the same label for the frames of data being sent to the same destination, then it would not be possible for the destination to distinguish between these different frames, and cells of different frames would most likely become interleaved making it virtually impossible for the destination to recover the original frames.

Another solution is to identify the source of the frame with the particular request, thereby allowing the destination, as well as intermediary switches in the network, to identify which frames correspond to which sources. However, an additional problem can arise because it is possible that multiple paths from source to destination may exist, any one or more of which can be used by the source. Thus, cell interleaving can still occur because, although the source and destination for a frame may be known, the exact path taken by a frame, and thus which cells belong to which frame, would not be known to the destination.

Thus, a need exists for an improved way to provide for data stream aggregation in a multiprotocol label switching network environment.

SUMMARY OF THE INVENTION

A method and apparatus for stream aggregation in a multiprotocol label switching network environment is described herein. According to one aspect of the present invention, a method for aggregating data streams in a multiprotocol label switching network includes receiving a label assignment request that includes an identification of a path followed by the label assignment request through the network and determining whether the path has been used by any of a plurality of previous label assignment requests. A new label is assigned for the path if the path has not been used by any of the plurality of previous label assignment requests, otherwise a previously assigned label is assigned for the path.

According to one aspect of the present invention, a method in a switch of a multiprotocol label switching network includes receiving a label assignment request that includes an identification of a path followed by the label assignment request through the network to the switch, and determining whether the path has been used by any of a plurality of previous label assignment requests. A merge identifier is assigned to the label assignment request, the assigned merge identifier being either a new merge identifier, if the path has not been used by any of the plurality of previous label assignment requests, or a previously assigned merge identifier if the path has been used by any of the plurality of previous label assignment requests, and the merge identifier is forwarded along with the label assignment request to a next switch in the network.

BRIEF DESCRIPTION OF THE DRAWINGS

The present invention is illustrated by way of example and not limitation in the figures of the accompanying drawings, in which like references indicate similar elements and in which:

FIG. 3 is a flowchart illustrating the steps followed in transmitting data between devices using MPLS over an ATM network according to one embodiment of the present invention;

FIG. 5 illustrates port to MID value mappings according to one embodiment of the present invention;

FIG. 7 illustrates the stored mappings of an egress router according to one embodiment of the present invention.

DETAILED DESCRIPTION

Figure 1:
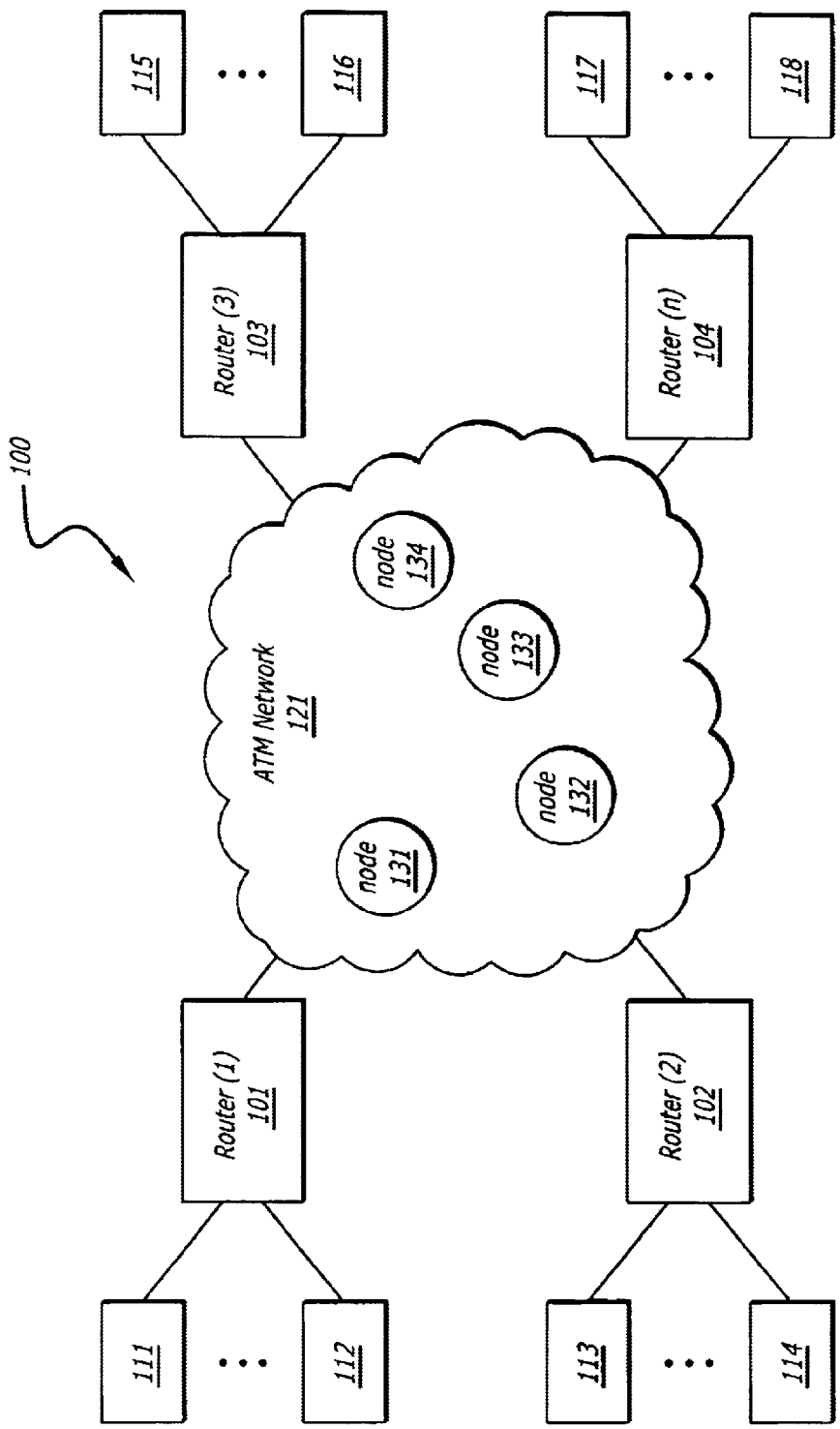
FIG. 1 illustrates a network environment supporting the multiprotocol label switching (MPLS) architecture in which one embodiment of the present invention can be used.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides for aggregating data streams in a multiprotocol label switching network environment. In order to transfer data to a destination device, a source device makes a label assignment request that propagates through the network. The source device is eventually assigned a label to be used in subsequent data transfers to the destination device. In assigning the label, a determination is made as to whether the path taken by the label assignment request has been used by any previous requests. If the path has been used, then the same label as was previously assigned to the request using that path is used for the current request. However, if the path has not been used, then a new label is assigned. Thus, data transfers through the network using the same path can be assigned the same label, thereby allowing multiple data streams to be aggregated onto a single label.

FIG. 1 illustrates a network environment supporting the multiprotocol label switching (MPLS) architecture in which one embodiment of the present invention can be used. Network environment 100 includes multiple (n) routers 101–104. These routers that are directly connected to the ATM network 121 are also referred to as "edge routers". Routers 101–104 can transmit data to and from other routers 101–104 via asynchronous transfer mode (ATM) switching network 121. Examples of routers 101–104 include any of a variety of routers available from Bay Networks, Inc. of Santa Clara, Calif., such as the backbone link node (BLN®) or backbone concentrator node (BCN®) routers.

Each router 101–104 is also coupled to one or more devices 111–118. A device 111–118 can be a source, a destination, or both a source and a destination. Each device 111–118 can be any component capable of transmitting and/or receiving data packets at the network layer level. Examples of devices 111–118 include routers, bridges, servers, workstations, etc.

ATM network 121 includes ATM switching hardware 131–134, also referred to as "switches", or "nodes", as illustrated. Examples of switches 131–134 include Centillion switches, available from Bay Networks, Inc. ATM network 121 transfers data by establishing virtual circuits using the ATM switching hardware 131–134. These virtual circuits are typically established at an initial configuration of the network environment 100. However, re-configuration of the environment may occur at regular or irregular intervals, or in response to particular events (e.g., addition of new switching hardware within network 121, or new sources or destinations in environment 100). Alternatively, the configuration may occur "on the fly", with new virtual circuits being established when needed. The virtual circuits are established using labels to route data, as discussed in more detail below.

A data transfer is initiated at a source device using the network layer address (e.g., the IP address) of the destination. The source device is provided with an identifier, referred to as a "label", to be used by the source device in transmitting data via ATM network 121. This label may have been previously provided in response to a previous request for a label (e.g., during configuration), or alternatively the source device may request a label when it first has data to be transferred to the destination device. This label is used to identify a virtual circuit through ATM network 121 that will be used to transfer the data from the source to the destination.

It should be noted that multiple devices may access ATM network 121 via common routers. For example, devices 111 and 112 may access ATM network 121 via router 101, and devices 115 and 116 may access ATM network 121 via router 103. Given that multiple devices may access the network 121 via common routers, some source to destination paths within network 121 will be the same. By way of example, data from device 111 to either device 115 or device 116 may follow the path from router 101 to node 131 to node 133 to node 134, while data from device 112 to either device 115 or 116 may also follow the path from router 101 to node 131 to node 133 to node 134. Thus, in this example there are four data transfer possibilities (device 111 to device 115, device 111 to device 116, device 112 to device 115, and device 112 to device 116) that share the same paths of edge routers and nodes. The present invention, as discussed in more detail below, allows multiple data streams sharing the same data path of edge routers and ATM network 121 nodes to be aggregated using the same label, thereby reducing the number of labels used by the switching hardware of network 121.

According to one embodiment of the present invention, the network layer used in network environment 100 is the Internet Protocol (IP). However, it is to be appreciated that alternate embodiments can be used with alternate network layer protocols, such as IPX, Appletalk, DECnet, CLNP, or combinations thereof.

Network environment 100 is intended to represent a sample environment in which the present invention can be practiced. It is to be appreciated that alternate environments can be used with either increased or decreased numbers of components, such as greater or fewer devices, greater or fewer ATM switches, greater or fewer routers, additional ATM networks, etc.

The MPLS portion of the network environment 100 includes ATM network 121 as well as edge routers 101–104. Additional information regarding MPLS can be found in "Multiprotocol Label Switching Architecture", E. Rosen et al., work in progress, draft-ietf-mpls-arch-02.txt, July 1998, and "A Framework for Multiprotocol Label Switching", R. Callon et al., work in progress, draft-ietf-mpls-framework-02.txt, Nov. 21, 1997.

Figure 2A:
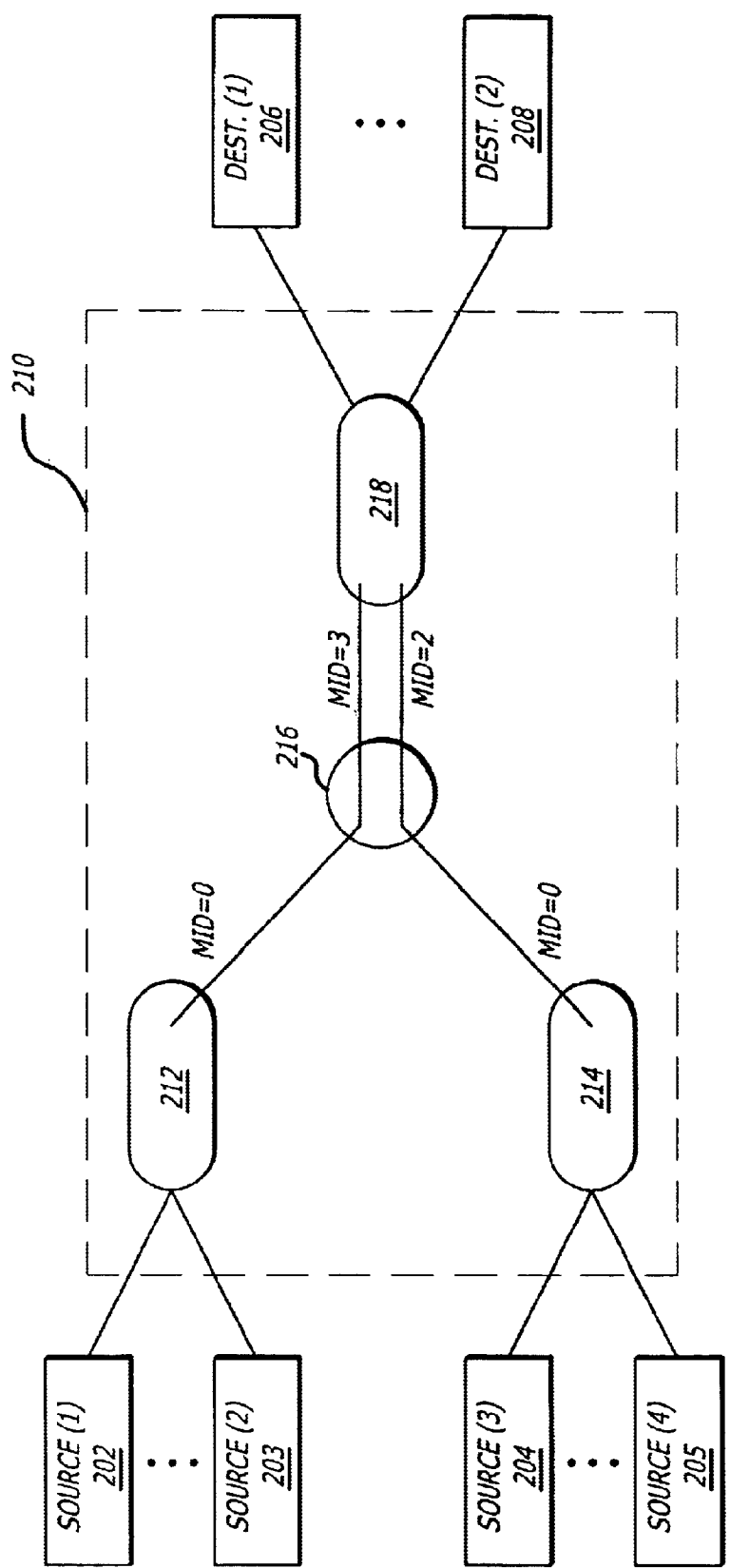
FIG. 2a is a diagram illustrating the aggregation of multiple MPLS data streams onto a single label according to one embodiment of the present invention.

FIG. 2a is a diagram illustrating the aggregation of multiple MPLS data streams onto a single label according to one embodiment of the present invention. For ease of explanation, only selected devices, routers, and switches from network environment 100 of FIG. 1 are illustrated in FIG. 2a. As illustrated, a data path is established from device 202 to either device 206 or device 208 via router 212, switch 216, and router 218. Additionally, a data path is established from device 204 to either device 206 or device 208 via router 214, switch 216, and router 218. Additional paths may also similarly be established from device 203 to either device 206 or 208, and from device 205 to either device 206 or 208.

As discussed above, labels are used to transfer data between devices via an ATM network. A data transfer from device 202 to device 206 enters an MPLS network 210 at router 212, so router 212 is also referred to as an "ingress router". The data transfer leaves MPLS network 210 at router 218, so router 218 is also referred to as an "egress router". Thus, in order to transfer data to destination device 206, ingress router 212 provides a label to switch 216 along with the data to be transferred. Switch 216 identifies, based on the received label, a new label and forwards the data and the new label to the router or switch identified by that new label, which is router 218 in the illustrated example. Upon receipt of the data and the label, router 218 identifies, based on the received label and/or the address of device 206, that device 206 is the destination for the data, so router 218 forwards the data to device 206.

The label to be used by ingress router 212 to transfer data to switch 216 is provided to router 212 by switch 216 in response to a label assignment request by router 212. Ingress router 212 submits a label assignment (or binding) request to switch 216 for a label to be used to transfer data to device 206 (as identified using, e.g., the IP address of device 206). The label assignment request propagates through switch 216 to router 218 which, being the egress router for the path, assigns a particular label to the request. This label uniquely identifies, from the point of view of egress router 218, the path from router 212 to router 218 via switch 216. Router 218 also stores a mapping of the label to destination device 206, so that subsequent data transfers to device 206 can be properly routed by router 218.

The response to the label assignment request by router 212 is returned to router 212 "backtracking" the path taken by the request. As the response is returned, switch 216 and router 212 each store label mapping information identifying a local label to be used to subsequently transfer data according to that path. Switch 216 stores the label that was provided by router 218, and also indicates to router 212 an appropriate label (which may or may not be identical to that assigned by router 218) to identify this path. It should be noted that labels between two switches or between a switch and a router uniquely identify that portion of the path (that is, the portion between the two switches or the switch and the router). Thus, the response received by switch 216 from router 218 (which includes a label uniquely identifying that 216 to 218 portion of the path from source 202 to destination 206) is used by switch 216 to assign a unique label for the portion of the path from router 212 to switch 216. The label that is included with the response thus changes for each portion of the path; the actual label assigned by router 218 is not passed from switch 216 to router 212.

FIG. 3 is a flowchart illustrating the steps followed in transmitting data between devices using MPLS over an ATM network according to one embodiment of the present invention. The ingress router initiates a label assignment request for a label to a particular destination device, step 305. This label assignment request propagates through the network according to a particular routing protocol, step 310. At the egress point of the network (e.g., the egress router), a label is assigned to the request and a label assignment response is returned, via the network, to the ingress router, step 315. The ingress router subsequently uses the label from the response to transmit data to the particular destination device, step 320.

According to one embodiment of the present invention, steps 305 through 315 are repeated for each destination device that the ingress router may transfer data to.

The particular path within the network followed by a particular request is dependent on the routing protocol in use on the network. The routing protocol identifies to a particular router within the ATM network where the packet should be routed to next, based on its ultimate destination. Any of a wide variety of conventional routing protocols can be used, such as the open shortest path first (OSPF) protocol or the routing information protocol (RIP). Such routing protocols are well-known to those skilled in the art and thus will not be discussed further except as they pertain to the present invention.

In determining what label to assign to a particular label assignment request, the egress router makes use of an additional identifier referred to as the "merge identifier" or "MID". As the label assignment request propagates through the network, each router to receive the request assigns either a previously used MID value or a new MID value to the request before propagating the request to the next router. The MID value is then used by the egress router to determine whether a previously used label can be re-used for the current request, as discussed in more detail below.

Figure 4:
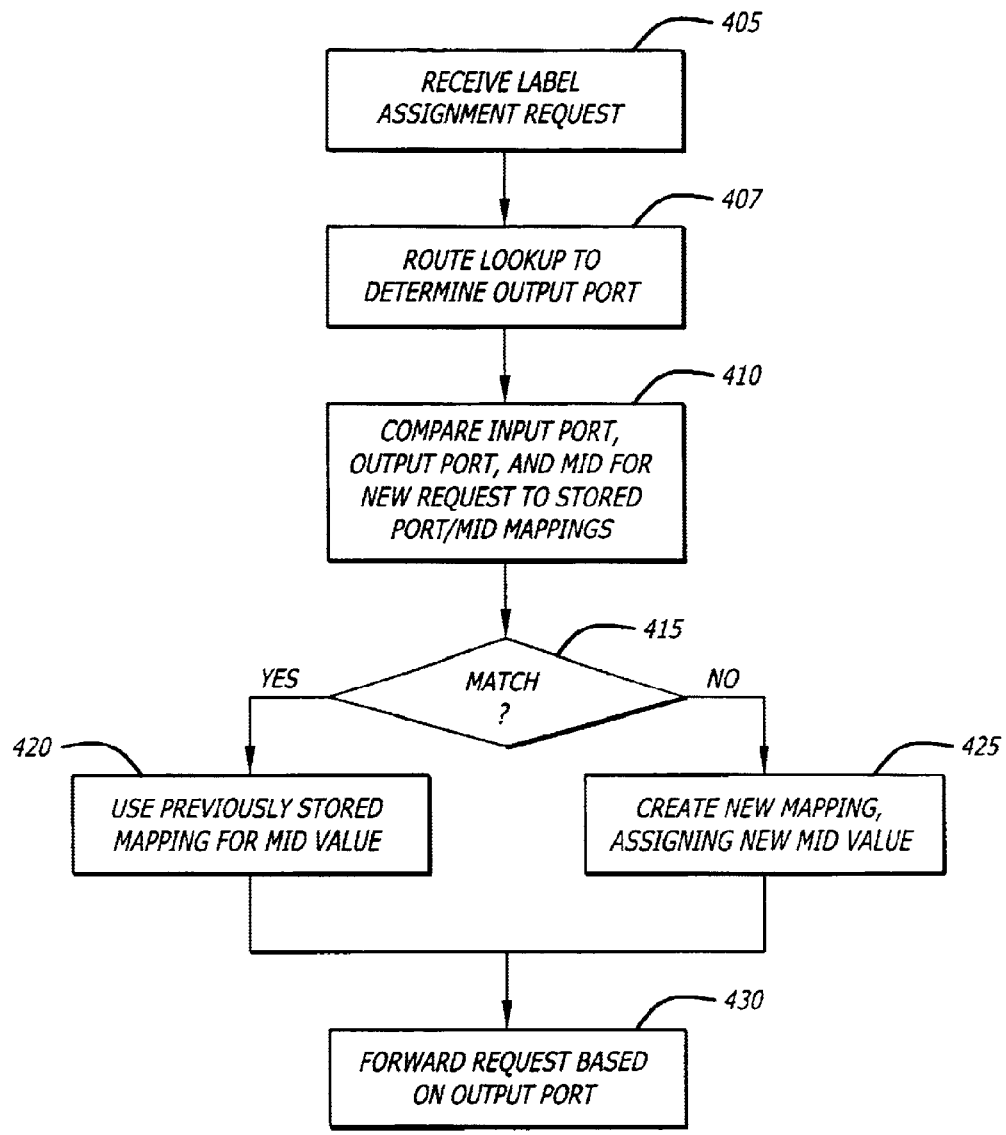
FIG. 4 is a flowchart illustrating the steps followed by a router in determining whether to assign a previously used or a new MID value according to one embodiment of the present invention.

FIG. 4 is a flowchart illustrating the steps followed by a switch in determining whether to assign a previously used or a new MID value according to one embodiment of the present invention. As illustrated, a label assignment request is received by the switch, step 405. The label assignment request includes a MID value from the previous router or switch in the path, and the request is received via a particular "port" of the switch (a switch is connected to another switch or to another device or router via a particular port of the switch). Upon receipt of the label assignment request, the switch determines the port on which the request will be forwarded (the "output port") using a conventional routing lookup, step 407. The switch then compares the port on which the request was received (the "input port") the output port, and the received MID value corresponding to the request to a stored set of input port, output port, and MID value mappings, step 410.

An ingress router can use the same MID value for each request corresponding to a data path that it is capable of aggregating with other data paths. By way of example, if router 212 of FIG. 2a is merge capable, then it could use the same MID value for requests from source 202 and 203 targeting destination 206 or 208. However, if router 212 were not merge capable, then two different MID values would be used by router 212, one for the label request for the path from source 202 to destination 206 or 208, and the other for a path from source 203 to destination 206 or 208. It should be noted that, as discussed in more detail below, by using the MID values the same label can be used for the path from source 202 to destination 206 and for the path from source 202 to destination 208, and that the same label can be used for the path from source 203 to destination 206 and from source 203 to destination 208. Thus, even if router 212 is not merge capable, the number of labels required in accordance with the present invention can be reduced.

FIG. 5 illustrates port to MID value mappings according to one embodiment of the present invention. As illustrated by table 500, the mappings of multiple input port and input MID value combinations to output port and output MID value combinations is maintained. It is to be appreciated that although the mappings are illustrated in FIG. 5 as being a table, the mappings can be stored using any of a wide variety of conventional data storage structures. Additionally, although the ports and MID values are illustrated as numbers, it is to be appreciated that any type of unique identifier can be used, such as decimal or binary numbers, character strings, symbols, etc.

Returning to FIG. 4, after the comparison is made in step 410, the switch checks whether the received input port, output port, and input MID value match any previously stored input port, output port, and input MID value combinations in table 500, step 415. If there is a match then the switch uses the previously stored output MID value mapped in table 500 to forward the label assignment request, step 420. This previously stored mapping identifies to the switch which MID value is to be output to the next router or switch along with the label assignment request. However, if there is not a match then the switch creates a new mapping in table 500 and assigns a new MID value for the appropriate input port, output port, and input MID value combination, step 425. The appropriate output port for the request is determined based on the routing protocol being used. The new MID value can be calculated in any of a wide variety of conventional manners (e.g., increment the highest currently mapped MID value for the port by one), with the only qualification being that it differ from the previously stored MID values for the output port.

Regardless of whether there is a match in step 415, an appropriate output port is determined in step 407, and MID value is determined in either step 420 or 425, and the label assignment request is forwarded to the next switch or router in the path based on the output port, step 430.

Figure 6:
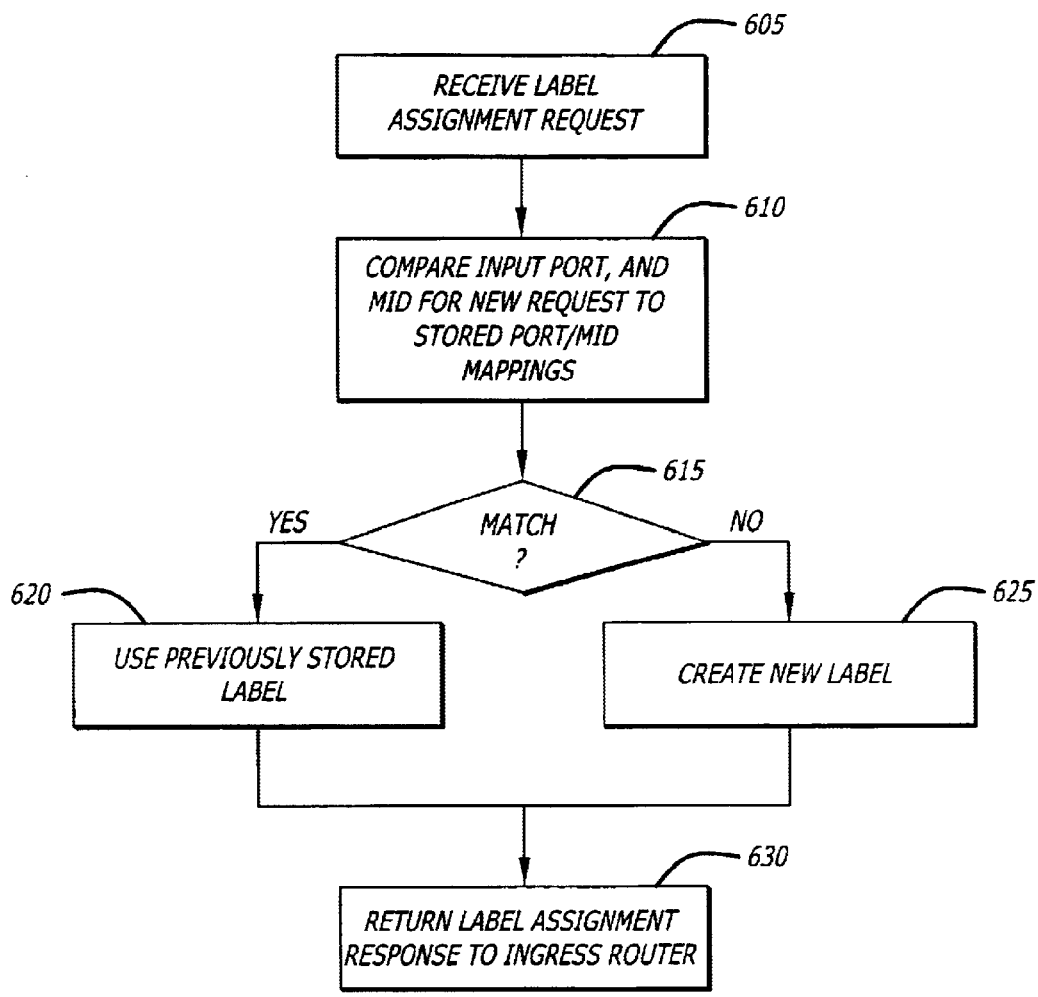
FIG. 6 is a flowchart illustrating the steps followed at an egress router in assigning a label to a request according to one embodiment of the present invention.

This process continues until the label assignment request propagates to the egress router for the path. FIG. 6 is a flowchart illustrating the steps followed at an egress router in assigning a label to a request according to one embodiment of the present invention. Upon receiving the label assignment request, step 605, the egress router compares the received port and MID value for the request to a set of stored port and MID value mappings, step 610. The stored mappings of the egress router are similar to the mappings discussed above with reference to FIG. 5, except that the stored mappings of the egress router can exclude an output port, and include a label corresponding to the path used by the mapping rather than MID values.

The stored mappings of the egress router according to one embodiment of the present invention are illustrated in FIG. 7. As illustrated by table 700, each input port and input MID value combination maps to a corresponding label. Although the labels are illustrated as numbers, it is to be appreciated that any type of unique identifier can be used, such as decimal or binary numbers, character strings, symbols, etc.

Returning to FIG. 6, after the comparison is made in step 610, the egress router checks whether the received input port and MID value match any previously stored input port and MID value combinations in table 700, step 615. If there is a match then the router uses the label previously stored in table 700 for the path, step 620. However, if there is not a match then the router creates a new mapping in table 700 and assigns a new label for the path, step 625.

Regardless of whether there is a match in step 615, a label for the path is determined by the egress router in either step 620 or 625, and a label assignment response is returned to the ingress router, step 630. Additional "intermediate" labels are also assigned by each of the switches in the path the response traverses back to the ingress router (i.e., switch 216 in the example of FIG. 2a), so that subsequent data transfers through the network 210 having that particular label can be output from the routers via the appropriate output ports, as discussed above. It is to be appreciated that, in returning the response, any such intermediate routers can re-use previously assigned labels if the egress router is re-using a label.

Thus, it can be seen that each MID value only has significance locally between two switches, and only for a particular port between those switches. The MID values between a first and a second switch do not have any relationship to the MID values between the second switch and a third switch.

Returning to FIG. 2a, the assignment of the MID values in accordance with one embodiment of the present invention is illustrated. Ingress router 212 obtains a label to transfer data from source device 202 to destination device 206 by submitting a label assignment request, accompanied by a MID value of 0, to the next switch according to the routing protocol, which is switch 216 in the illustrated example. Switch 216 receives the label assignment request via a particular port associated with router 212 (e.g., port 2). The combination of port 2 and MID value 0 indicates to switch 216, based on the table mappings and the routing protocol, to output the label assignment request on the port associated with router 218 (e.g., port 8) along with the MID value of 3. Router 218 receives the label assignment request via the port associated with switch 216 (e.g., port 6) and determines the appropriate label for the request, based on the table mappings.

A label assignment response is returned to switch 216, including the label for switch 216 to use in transferring data along the path of the request from switch 216 to router 218. Switch 216 then determines (based on the label received from router 218) the label to be used by router 212 in transferring data along the path of the request from router 212 to switch 216, and this label is transferred to router 212 in the label assignment response to router 212. It is to be appreciated that, if switch 216 receives a previously used label from router 218, then switch 216 likewise assigns the same label for the portion of the path from router 212 to switch 216 as it had used the previous time it received that same label from router 218. However, if a new label is received from router 218, then a new label for the portion of the path from router 212 to switch 216 is assigned by switch 216.

Similarly, ingress router 214 obtains a label to transfer data from source device 204 to destination device 206 by submitting a label assignment request, accompanied by a MID value of 0, to the next switch according to the routing protocol, which is switch 216 in the illustrated example. Switch 216 receives the label assignment request via a particular port associated with router 214 (e.g., port 4). The combination of port 4 and MID value 0 indicates to switch 216, based on the table mappings and the routing protocol, to output the label assignment request on the port associated with router 218 (e.g., port 8) along with the MID value of 2. Router 218 receives the label assignment request via the port associated with switch 216 (e.g., port 6) and determines the appropriate label for the request, based on the table mappings. A label assignment response is then returned to ingress router 214, providing router 214 with a label for subsequent data transfers.

Additionally, ingress router 212 obtains a label to transfer data from source device 202 to destination device 208 by submitting a label assignment request, accompanied by a MID value of 0, to the next switch according to the routing protocol, which is switch 216 in the illustrated example. Switch 216 receives the label assignment request via a particular port associated with router 212 (e.g., port 2). The combination of port 2 and MID value 0 indicates to switch 216, based on the table mappings and the routing protocol, to output the label assignment request on the port associated with router 218 (e.g., port 8) along with the MID value of 3. Router 218 receives the label assignment request via the port associated with switch 216 (e.g., port 6) and determines the appropriate label for the request, based on the table mappings. A label assignment response is then returned to ingress router 212, providing ingress router 212 with a label for subsequent data transfers. It should be noted that this label is the same label as was returned to ingress router 212 in response to the label assignment request to destination device 206.

Thus, it can be seen that by using the MID values of the present invention, identical routes through MPLS network 210 can be identified by the router assigning the labels (e.g., the egress router), thereby reducing the number of label mappings maintained by the switch 216 and each of the routers 212, 214, and 218 in network 210.

It is to be appreciated that the paths through network 210 from source device 202 to destination device 206 and from source device 204 to destination device 206 are different (e.g., different ingress routers). Thus, two different labels are assigned to the two different paths by egress router 218. Even though the label requests are received by egress router 218 from switch 216 via the same input port, the MID values received from switch 216 allow router 218 to identify the two paths as being different.

Figure 2B:
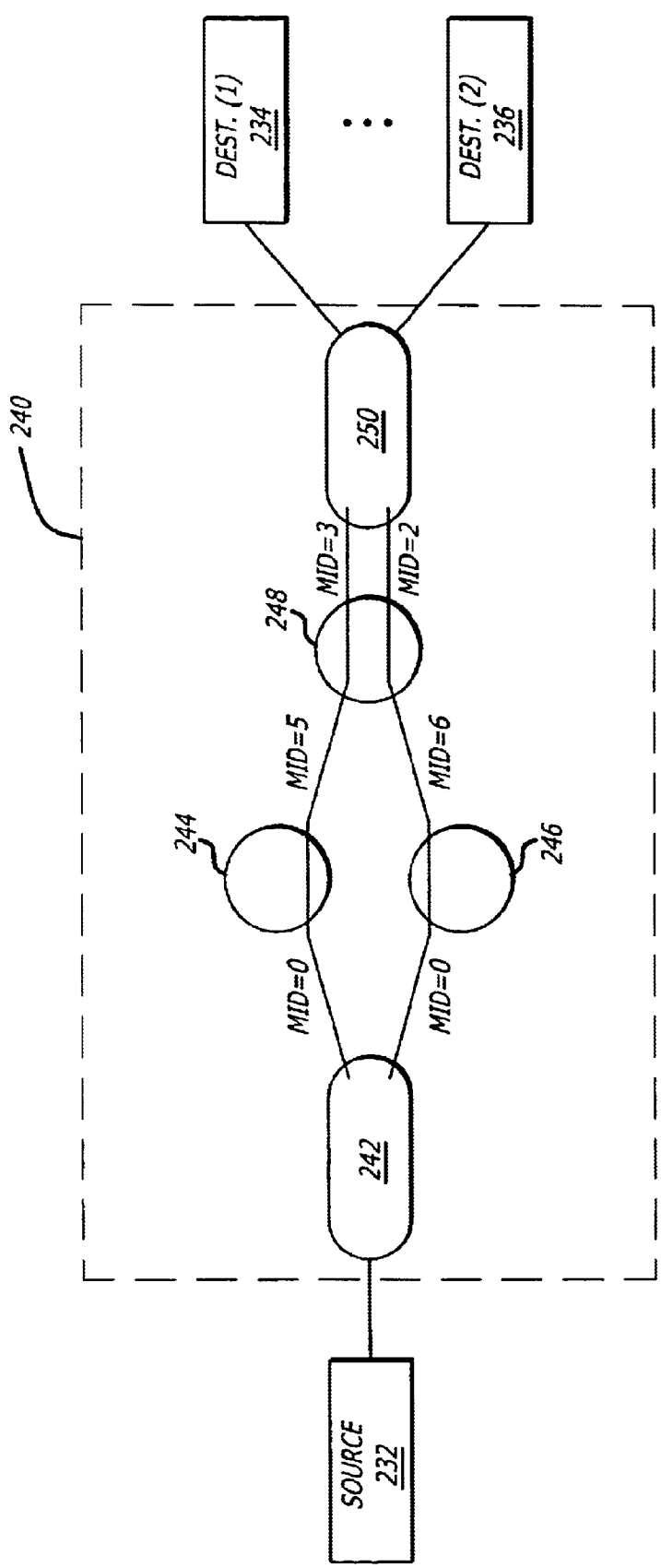
FIG. 2b illustrates using MID values during label assignment according to one embodiment of the present invention.

FIG. 2b illustrates another example of using MID values during label assignment according to one embodiment of the present invention. FIG. 2b illustrates the ability of the present invention to detect different paths within the ATM network even though the ingress and egress routers may be the same. Ingress router 242 obtains a label to transfer data from source device 232 to destination device 234 in MPLS network 240 by submitting a label assignment request, accompanied by a MID value of 0, to the next switch according to the routing protocol, which in the illustrated example could be either switch 244 or 246. Thus, subsequent data transfers from source device 232 to destination device 234 could follow the path of either switch 244 or switch 246. Therefore, two different label assignment requests are forwarded by router 242, one to switch 244 and another to switch 246.

Switch 244 receives the label assignment request via a particular port associated with router 242 (e.g., port 2). The combination of port 2 and MID value 0 indicates to switch 244, based on the table mappings and the routing protocol, to output the label assignment request on the port associated with switch 248 (e.g., port 8) along with the MID value of 5. Switch 248 receives the label assignment request via the port associated with switch 244 (e.g., port 4). The combination of port 4 and MID value 5 indicates to switch 248, based on the table mappings and the routing protocol, to output the label assignment request on the port associated with router 250 (e.g., port 0) along with the MID value of 3. Router 250 receives the label assignment request via the port associated with switch 248 (e.g., port 8) and determines the appropriate label for the request, based on the table mappings. A label assignment response is then returned to ingress router 242, providing router 242 with a label for subsequent data transfers.

Additionally, switch 246 also receives a label assignment request via a particular port associated with router 242 (e.g., port 1). The combination of port 1 and MID value 0 indicates to switch 246, based on the table mappings and the routing protocol, to output the label assignment request on the port associated with switch 248 (e.g., port 4) along with the MID value of 6. Switch 248 receives the label assignment request via the port associated with switch 246 (e.g., port 3). The combination of port 3 and MID value 6 indicates to switch 248, based on the table mappings and the routing protocol, to output the label assignment request on the port associated with router 250 (e.g., port 0) along with the MID value of 2. Router 250 receives the label assignment request via the port associated with switch 248 (e.g., port 8) and determines the appropriate label for the request, based on the table mappings. A label assignment response is then returned to ingress router 242, providing router 242 with a label for subsequent data transfers. It should be noted that this label is different than the label that was returned to router 242 via switch 244.

Thus, ingress router 242 is provided with two different labels for transfers from source device 232 to destination device 234. It is also to be appreciated that these same labels are also used to transfer data from source device 232 to destination device 236.

As mentioned above, an additional problem that can be introduced in aggregating data streams through an MPLS network environment is referred to as "cell interleaving". The source and destination devices within the network environment transfer and control data on a "frame" basis. However, the routers within an ATM network typically transfer data in smaller portions, referred to as "cells". Cells are typically on the order of tens of bytes (e.g., 45 to 60 bytes) in length, while frames are typically on the order of hundreds or thousands of bytes in length.

Referring to FIG. 2a, when transferring data from source device 202 to destination device 206, ingress router 212 separates the data frame into cells and forwards the data to switch 216 on a cell-by-cell basis. However, there is no guarantee that the entire frame will be transferred from router 212 to switch 216 prior to router 214 beginning a data transfer to switch 216. Additionally, referring to FIG. 2b, there is no guarantee that all cells for a frame originating with router 242 that are received at switch 248 from switch 244 will be received prior to switch 248 receiving cells for another frame from switch 246 that also originated with router 242. Thus, care should be taken to ensure that the cells from these two different frames are not improperly interleaved.

By way of example, if MID values in accordance with the present invention were not used, then router 250 could receive multiple label requests from switch 248 targeting the same destination (e.g., device 234) and, since the requests are received from the same previous switch (switch 248) and target the same destination (device 234), router 250 may assign the same label. However, router 250 would have no knowledge of the two possible paths the requests could have taken, one through switch 244 and the other through switch 246. If the same label were used for both paths, then the cells from two different frames, one being transferred along each of the two paths, may be improperly interleaved because router 250 does not have any ability to distinguish between the two different frames.

The use of the MID values for different data paths during label assignment in accordance with the present invention resolves this cell interleaving problem. During the label assignment, the MID values allow data streams to be aggregated onto the same label only when the paths are the same. Thus, by having the label uniquely identify the path, the router can ensure that during subsequent data transfers cells from two different paths will not be using the same label. Therefore, a switch or router will not interleave cells from two different frames because the cells from the different frames are using different labels.

Figure 8:
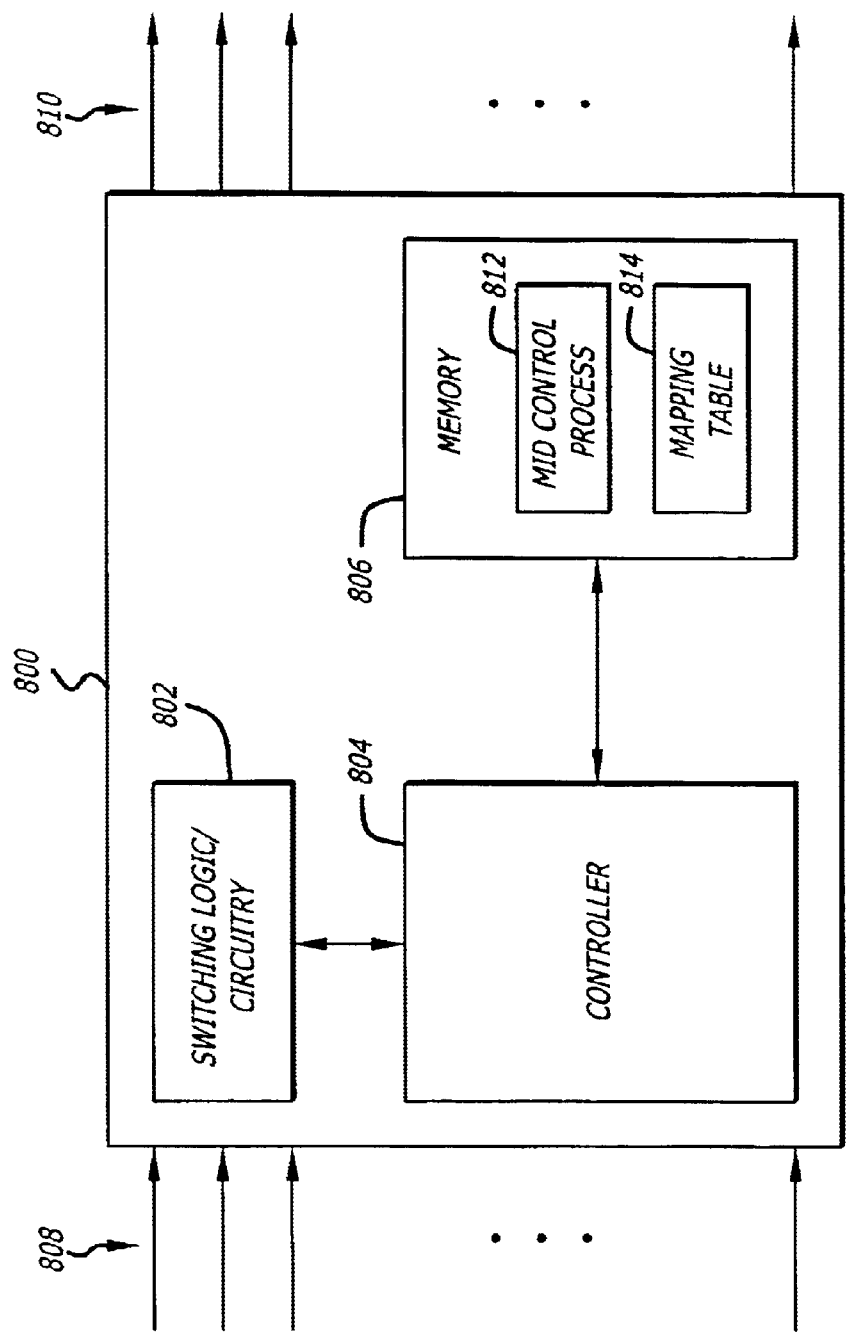
FIG. 8 is a block diagram illustrating an example hardware device incorporating one embodiment of the present invention.

FIG. 8 is a block diagram illustrating an example hardware device incorporating one embodiment of the present invention. As illustrated, a switch 800 includes switching logic or circuitry 802, controller 804, and memory 806, coupled together as illustrated. Multiple input ports 808 transfer data into switch 800 and multiple output ports 810 transfer data out of switch 800. Alternatively, some ports 808 or 810 may be both input and output ports. The mapping of input port to output port is performed by switching logic 802 under the control of controller 804. Memory 806 includes a MID control process 812 and a mapping table 814. Mapping table 814 stores the input to output port and MID value combinations discussed above (e.g., table 500 of FIG. 5). MID control process 812, when executed by controller 804, controls the MID value generation of the present invention (e.g., the processes of FIGS. 4 and 6 discussed above). Memory 806 also stores the labels used by switch 800 in transferring data from input to output ports. Similar control processes and mapping tables are also used in the ingress and egress routers of the MPLS network.

In the illustrated embodiment, the present invention is implemented as a series of software routines run by the hardware system of FIG. 8. These software routines comprise a plurality or series of instructions to be executed by a processor or controller in a hardware system, such as controller 804. Initially, the series of instructions are stored on a storage device and are copied from the storage device into memory 806 (MID control process 812) and then accessed and executed by controller 804. It is to be appreciated that these routines may be implemented in any of a wide variety of programming languages. In alternate embodiments, the present invention is implemented in discrete hardware or firmware. For example, an application specific integrated circuit (ASIC) could be programmed with the functions of the present invention.

In the discussions above, reference is made to ingress and egress routers as being the "entry" and "exit" points of an ATM network. In alternate embodiments, however, the network domain to which the entry and exit points refer can be different than the entire ATM network. By way of example, the network domain may be multiple ATM networks coupled together, a small portion of an ATM network, only the portion of a network that supports MPLS, etc.

Also in the discussions above, the egress router is described as aggregating multiple data streams onto a single label where possible. In alternate embodiments, such aggregation may not always occur. By way of example, it may be desirable to provide separate labels to a particular destination device even though it is possible to aggregate the data streams onto a single label in accordance with the present invention.

Additionally, in some of the embodiments discussed above the routers within the ATM network are not merge capable. In alternate embodiments, one or more of the routers may be merge capable. A merge capable router is a router with the additional capability, typically provided using additional hardware within the router, of merging frames received with different labels onto the same outgoing port with the same label. Any such merging is made as a local decision by the router, with preceding and subsequent switches and/or routers having (or needing) no knowledge of the merging. Regardless of whether a particular router is merge capable, the present invention can still aggregate data streams in the manner discussed above.

Also in the discussions above, the present invention is described as being implemented using ATM switching hardware. It is to be appreciated, however, that the present invention can be used with MPLS in any of a variety of implementations, and is not limited to the use of ATM networks.

Therefore, the present invention provides for stream aggregation in a multiprotocol label switching network environment. The present invention advantageously allows paths through the network to be uniquely identified, thereby allowing for stream aggregation where possible while at the same time protecting against the problem of cell interleaving. The present invention allows certain data streams to be aggregated onto a single label, thereby reducing the number of labels required in a multiprotocol label switching network environment. Furthermore, the present invention advantageously provides for stream aggregation by adding additional processing during the configuration of the network environment and without requiring either hardware modification to the components of the network or modification of the routing protocols in use by the network.

Thus, a method and apparatus for stream aggregation in a multiprotocol label switching network environment has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method for aggregating data streams in a multiprotocol label switching (MPLS) network, the method comprising:
    receiving a label assignment request that includes a merge identifier to identify a portion of a path followed by the label assignment request through the MPLS network;
    determining whether the portion of the path has been used by any of a plurality of previous label assignment requests; and
    assigning a new label for the portion of the path if the portion of the path has not been used by any of the plurality of previous label assignment requests, otherwise assigning a previously assigned label for the portion of the path; and
    returning an indication of either the new label or the previously assigned label based on the determination.

2. The method of claim 1, wherein the indication returned to a source of the label assignment request is a label assignment response.

3. The method of claim 1, further comprising maintaining a record of each label assigned for each of a plurality of paths through the (MPLS) network.

4. The method of claim 1, wherein the (MPLS) network includes a plurality of asynchronous transfer mode (ATM) switches.

5. A method in a switch of a multiprotocol label switching (MPLS) network, the method comprising:
    receiving a label assignment request that includes a merge identifier to identify a portion of a path followed by the label assignment request through the MPLS network to the switch;
    determining whether a next portion of the path has been used by any of a plurality of previous label assignment requests;
    assigning a new merge identifier to the label assignment request if the next portion of the path has not been used by any of the plurality of previous label assignment requests;
    reassigning the merge identifier if the next portion of the path has been used by any of the plurality of previous label assignment requests; and
    forwarding both the label assignment request with at least one of the assigned, new merge identifier and the previously assigned merge identifier to a next switch in the MPLS network.

6. The method of claim 5, further comprising:
    maintaining a record of previously used merge identifiers, corresponding input ports of the switch on which label assignment requests are received, and corresponding output ports of the switch on which the label assignment requests are forwarded.

7. The method of claim 5, wherein the inclusion of the merger identifier by the label assignment request is equivalent to the label assignment request being accompanied by the merger identifier.

8. An apparatus for aggregating data streams in a multiprotocol label switching (MPLS) network, the apparatus comprising:
    a plurality of input ports to receive data and label assignment requests; and
    a controller, coupled to the plurality of input ports, to:
        receive a label assignment request that includes a merge identifier to identify a portion of a path followed by the label assignment request through the network,
        determine whether a next portion of the path has been used by any of a plurality of previous label assignment requests, and
        reassign the merge identifier for the next portion of the path that is able to be aggregated with the portion of the path, and otherwise assign a new merge identifier for the path.

9. The apparatus of claim 8, wherein the controller is further to maintain a record of each merge identifier assigned for each of a plurality of paths through the MPLS network.

10. The apparatus of claim 8, wherein the apparatus comprises one of a plurality of asynchronous transfer mode (ATM) nodes in the MPLS network.

11. The apparatus of claim 8, wherein the receiving of the label assignment request that includes the merger identifier by the controller includes is equivalent to the controller receiving the label assignment request accompanied by the merger identifier.

12. An apparatus comprising:
    a plurality of input ports to receive data and label assignment requests; and
    a controller, coupled to the plurality of input ports, to:
        receive a label assignment request that includes a merge identifier to identify a portion of a path followed by the label assignment request through a network to the apparatus,
        determine whether a next portion of the path has been used by any of a plurality of previous label assignment requests,
        assign either a new merge identifier if the next portion of the path has not been used by any of the plurality of previous label assignment requests, or a previously assigned merge identifier if the next portion of the path has been used by any of the plurality of previous label assignment requests, and
        forward both the label assignment request and the assigned merge identifier to a next node in the network.

13. The apparatus of claim 12, further comprising a memory to store a record of previously used merge identifiers, corresponding input ports of the apparatus on which label assignment requests are received, and corresponding output ports of the apparatus on which the label assignment requests are forwarded.

14. The apparatus of claim 12, wherein the receiving of the label assignment request that includes the merger identifier by the controller includes is equivalent to the controller receiving the label assignment request accompanied by the merger identifier.

15. A system comprising:
a plurality of routers to transmit and receive data; and
a plurality of asynchronous transfer mode (ATM) switches interconnected in a multiprotocol label switching (MPLS) network and coupled to the plurality of routers, each of the plurality of ATM switches including,
  a plurality of input ports to receive data and label assignment requests, and
  a controller, coupled to the plurality of input ports, to:
    receive a label assignment request accompanied by a merge identifier to identify a portion of a path followed by the label assignment request through the MPLS network to the switch,
    determine whether a next portion of the path has been used by any of a plurality of previous label assignment requests,
    assign either a new merge identifier if the next portion of the path has not been used by any of the plurality of previous label assignment requests, or a previously assigned merge identifier if the next portion of the path has been used by any of the plurality of previous label assignment requests, and
    forward both the label assignment request and the assigned merge identifier to a next switch in the MPLS network.

16. A machine-readable medium having stored thereon a plurality of instructions, designed to be executed by a processor, for implementing a function to:
receive a label assignment request that includes a merge identifier to identify a portion of a path followed by the label assignment request through a multiprotocol label switching (MPLS) network;
determine whether a next portion of the path has been used by any of a plurality of previous label assignment requests; and
assign a new label for the next portion of the path if the next portion of the path has not been used by any of the plurality of previous label assignment requests, otherwise assigning a previously assigned label.

17. The machine-readable medium of claim 15, wherein the plurality of instructions are further for implementing a function to maintain a record of each label assigned for each of a plurality of paths through the network environment.

18. The machine-readable medium of claim 15, wherein the network includes a plurality of asynchronous transfer mode (ATM) switches.

19. The machine-readable medium of claim 18, wherein the label identifies a virtual circuit through the ATM switches.

20. The machine-readable medium of claim 16, wherein the inclusion of the merge identifier by the label assignment request is equivalent to the label assignment request being accompanied by the merge identifier.

21. A machine-readable medium having stored thereon a plurality of instructions, designed to be executed by a controller in a switch of a multiprotocol label switching (MPLS) network, for implementing a function to:
receive a label assignment request that includes a merge identifier to identify a portion of a path followed by the label assignment request through the MPLS network to the switch;
determine whether a next portion of the path has been used by any of a plurality of previous label assignment requests;
assign either a new merge identifier if the next portion of the path has not been used by any of the plurality of previous label assignment requests, or a previously assigned merge identifier if the next portion of the path has been used by any of the plurality of previous label assignment requests; and
forward both the label assignment request and the assigned merge identifier to a next switch in the network.

22. The machine-readable medium of claim 21, wherein the plurality of instructions are further for implementing a function to:
maintain a record of at least previously used merge identifiers, corresponding input ports of the switch on which label assignment requests are received, and corresponding output ports of the switch on which the label assignment requests are forwarded.

23. The machine-readable medium of claim 21, wherein the inclusion of the merge identifier by the label assignment request is equivalent to the label assignment request being accompanied by the merge identifier.

24. A multiprotocol label switching (MPLS) network, comprising:
a source device; and
a router to receive a label assignment request from the source device, the label assignment request including a merge identifier to identify a path followed by the label assignment request, (ii) determine whether the portion of the path has been used by any of a plurality of previous label assignment requests, (iii) assign a new label for the portion of the path if the portion of the path ahs not been used by any of the plurality of previous label assignment requests, otherwise assigning a previously assigned label for the portion of the path, and (iv) return a label assignment response including either the new label of the previously assigned label based on the determination.

25. The MPLS network of claim 24, wherein the router maintains a record of each label assigned for each of a plurality of paths through the MPLS network.

26. The MPLS network of claim 24 comprises a plurality of asynchronous transfer mode (ATM) switches for coupling the source device to the router.

* * * * *